(12) United States Patent
Monroe

(10) Patent No.: US 8,090,693 B2
(45) Date of Patent: *Jan. 3, 2012

(54) SYSTEM, METHOD, AND ARTICLE OF MANUFACTURE FOR MAINTAINING AND ACCESSING A WHOIS DATABASE

(75) Inventor: Steven C. Monroe, Lovettsville, VA (US)

(73) Assignee: VeriSign, Inc., Dulles, VA (US)

( * ) Notice: Subject to any disclaimer, the term of this patent is extended or adjusted under 35 U.S.C. 154(b) by 587 days.

This patent is subject to a terminal disclaimer.

(21) Appl. No.: 12/237,107

(22) Filed: Sep. 24, 2008

(65) Prior Publication Data

US 2009/0024669 A1 Jan. 22, 2009

Related U.S. Application Data

(63) Continuation of application No. 09/894,904, filed on Jun. 29, 2001, now Pat. No. 7,467,140.

(60) Provisional application No. 60/215,763, filed on Jun. 30, 2000.

(51) Int. Cl.
*G06F 7/00* (2006.01)
*G06F 17/00* (2006.01)
*G06F 15/173* (2006.01)

(52) U.S. Cl. .................... 707/661; 707/690; 709/223

(58) Field of Classification Search ............ None
See application file for complete search history.

(56) References Cited

U.S. PATENT DOCUMENTS

| 5,134,696 | A | | 7/1992 | Brown et al. |
|---|---|---|---|---|
| 5,418,957 | A | * | 5/1995 | Narayan .................. 717/113 |
| 5,778,367 | A | | 7/1998 | Wesinger, Jr. et al. |
| 5,948,061 | A | | 9/1999 | Merriman et al. |
| 6,018,761 | A | | 1/2000 | Uomini |
| 6,151,624 | A | * | 11/2000 | Teare et al. ................. 709/217 |
| 6,182,227 | B1 | | 1/2001 | Blair et al. |
| 6,356,903 | B1 | | 3/2002 | Baxter et al. |
| 6,442,549 | B1 | * | 8/2002 | Schneider ..................... 1/1 |
| 6,519,589 | B2 | | 2/2003 | Mann et al. |
| 6,560,634 | B1 | | 5/2003 | Broadhurst |
| 6,574,637 | B1 | * | 6/2003 | Lindsey .................... 707/714 |
| 6,745,248 | B1 | | 6/2004 | Gardos et al. |
| 6,760,746 | B1 | * | 7/2004 | Schneider .................. 709/203 |
| 6,769,031 | B1 | | 7/2004 | Bero |
| 6,880,007 | B1 | * | 4/2005 | Gardos et al. ............. 709/225 |
| 7,467,140 | B2 | * | 12/2008 | Monroe ....................... 1/1 |

* cited by examiner

*Primary Examiner* — Susan Chen
(74) *Attorney, Agent, or Firm* — Finnegan, Henderson, Farabow, Garrett & Dunner, L.L.P.

(57) ABSTRACT

Methods and systems are provided for maintaining and accessing a whois database. In one embodiment, modifications to a registrar database that includes information about domain names are tracked, and based on the tracked modifications, one or more records that include modified information about the domain names are identified. Unique identifiers for the identified one or more records are determined and are used to reflect the modifications in the whois database. The modifications are tracked on a real-time basis and are reflected in the whois database on an hourly or a real-time basis.

28 Claims, 8 Drawing Sheets

100

US 8,090,693 B2

SYSTEM, METHOD, AND ARTICLE OF MANUFACTURE FOR MAINTAINING AND ACCESSING A WHOIS DATABASE

RELATED APPLICATIONS

This application is a continuation of U.S. application Ser. No. 09/894,904, filed Jun. 29, 2001 now U.S. Pat. No. 7,467,140, which claims the benefit of U.S. Provisional Patent Application No. 60/215,763, filed Jun. 30, 2000, the content of each of which is hereby incorporated by reference in its entirety.

DESCRIPTION OF THE INVENTION

1. Field of the Invention

The present invention relates generally to a whois database, and more particularly, a system, method, and article of manufacture for maintaining and accessing a whois database.

2. Background Information

In recent years, the Internet has experienced explosive growth and success mainly because it provides users with quick access to a vast array of resources through web sites setup by organizations and individuals. Each web site may have a web address or a hierarchical address (e.g., www.networksolutions.com) that a user may use to access the web site. A hierarchical address may include a host name and a domain name (e.g., networksolutions. com).

Before a domain name is activated, however, one must register a domain name with a registrar (e.g., Network Solutions, Inc.) and provide to the registrar registration information, such as domain name, name, address, administrative contact, technical contact, billing contact, and name server information. The registrar may store the registration information in a registrar database and provide some or all of the registration information to the Internet registry responsible for maintaining registered domain names.

The registrar may also store some or all of the registration information in a whois database, which many users use to obtain domain name information. For example, one may query the whois database to determine if a domain name has already been registered by someone else or to obtain other information, such as contact information for the administrator of a domain name. Domain name information may include registration information and other related information, such as the date and time when a record is last updated. Although the whois database is generally used for obtaining domain name information, it may also be used to obtain information about persons, name servers, hosts, etc.

One problem with the present whois database, however, is that its information may not be current because of delays in copying current registration information from the registrar database. For example, on a given day, the registrar may process several new registrations. In addition to new registrations, a registrar may modify or delete several records existing in the registrar database. Then, at the end of the day, the registrar may make a copy of the entire registrar database, and from the copy of the registrar database, the registrar may copy the registration information for each record into a whois database. This two-stage copy process may take a substantial amount of time (e.g., a few hours or even days in some instances) depending on the size of the registrar database. Moreover, in some cases, the registrar database may include other information in addition to registration information, such as information on products and employees, and thus the copying process may take even more time. Furthermore, in some cases, the registration information may need to be converted into another format before it is copied into the whois database, thus causing further delays in transferring the registration information to the whois database.

SUMMARY OF A FEW ASPECTS OF THE INVENTION

To address the above and other problems of the prior art, methods and systems are provided for maintaining and accessing a whois database. Such methods and systems track modifications to a registrar database that includes information about domain names. Based on the tracked modifications, one or more records including modified information about the domain names may be identified. Then, identifiers for the identified one or more records may be determined and the modifications may be reflected in the whois database based on the determined identifiers. The modifications may be tracked on a real-time basis and may be reflected in the whois database on an hourly or a real-time basis. The whois database may be accessed using, for example, a java database connectivity (JDBC) interface.

A flat file database and index files from the whois database may also be generated so that information, including domain name information, can be retrieved from the flat file database instead of the whois database.

Both the foregoing and the following description are exemplary and explanatory and are intended to provide further explanation of the claimed invention as opposed to limiting it in any manner.

BRIEF DESCRIPTION OF THE DRAWINGS

The accompanying drawings are incorporated in and constitute a part of this specification, and together with the description, explain the principles of the invention. In the drawings.

DETAILED DESCRIPTION

The following detailed description of the invention refers to the accompanying drawings. While the description includes exemplary embodiments, other embodiments are possible and changes may be made to the embodiments described without departing from the spirit and scope of the invention. The following detailed description does not limit the invention. Instead, the appended claims and their equivalents define the scope of the invention.

Methods and systems are provided to facilitate maintenance and access to a whois database. In one embodiment, a system may include one or more client computers, a registrar computer, a whois computer, and a service computer. The registrar computer may include a registrar database that includes registration information, such as domain name and name and address of the owner of this registered domain name. Whenever a record is added, deleted, or changed in the registrar database, a database management system or another process on the registrar computer may write the identifier corresponding to the added, deleted, or changed record in an audit file.

From the audit file, an update process running on the whois computer may, either periodically or on a real-time basis, extract the identifiers and update a whois database located on the whois computer by, for example, adding, deleting, or changing the information in the records corresponding to the identifiers.

In addition, a user at the client terminal may request information, such as domain name information from the service computer, which in turn may request the information from the whois database. The whois computer retrieves the requested information and sends it to the service computer, which may then display it to the user. Both the whois computer and the service computer may include a java database connectivity (JDBC) interface for processing these requests.

In another embodiment, the whois computer may include a dump process to create a flat file database from the whois database and an index process to create one or more index files for retrieving data from the flat file database. In addition, the whois computer may include a copy process to copy the flat file database and index files to a service computer. The whois computer may create and copy the flat file database and index files on a periodic basis, for example, hourly. When a user at a client terminal requests information, the service computer may use the index files to retrieve the requested information from the flat file database and present the retrieved information to the user.

Figure 1:
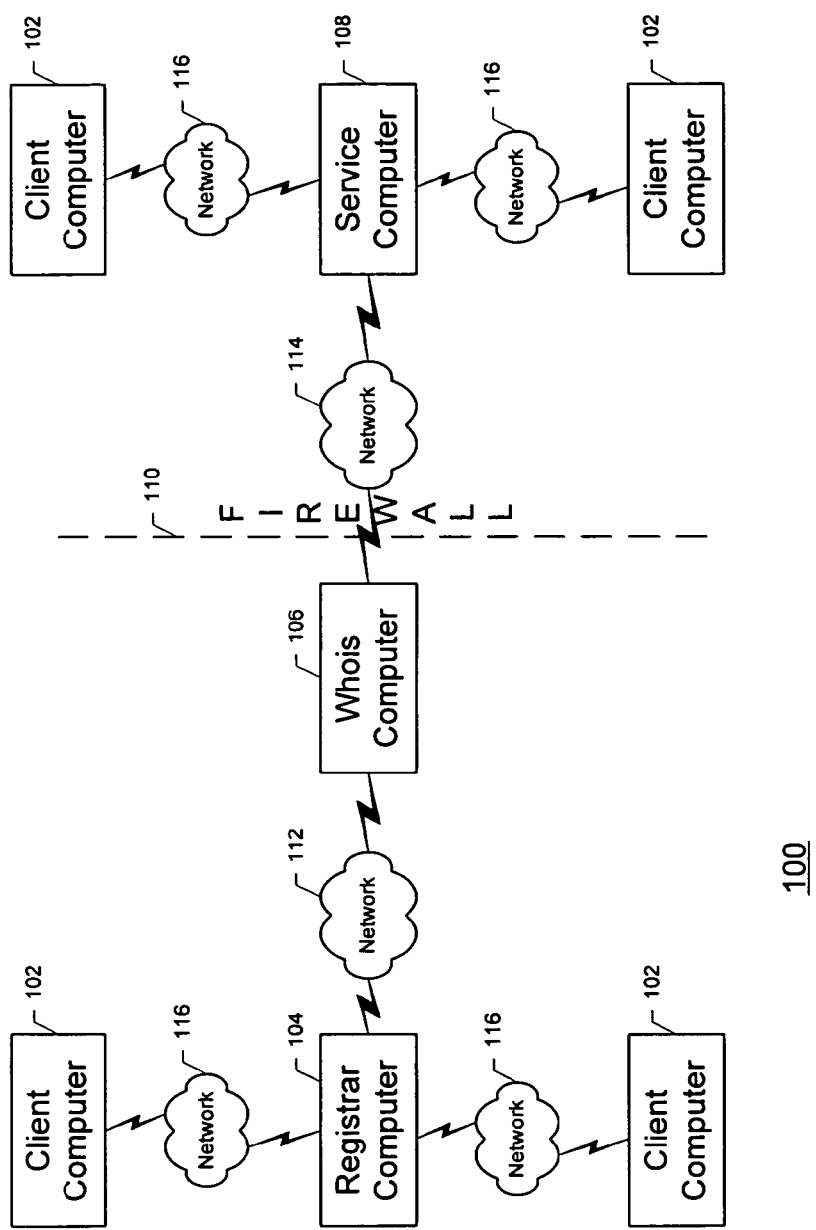
FIG. 1 is an exemplary block diagram of a system, in accordance with methods and systems consistent with the present invention.

FIG. 1 is an exemplary block diagram of a system 100, in accordance with methods and systems consistent with the present invention. System 100 may comprise one or more client computers 102, a registrar computer 104, a whois computer 106, a service computer 108, and a firewall 110. Registrar computer 104 may interface whois computer 106 via a network 112; whois computer 106 may interface service computer 108 via a network 114; and client computers 102 may interface registrar computer 104 or service computer 108 via a network 116.

Each client computer 102 may include a computer or any other processor capable of communicating with other computers. A user may use client computer 102 to perform various tasks, including registering domain names with registrar computer 104 and requesting information, such as domain name information from service computer 108. Client computer 102 may include a browser, such as Internet Explorer or Netscape Navigator to assist the user in performing these tasks.

Registrar computer 104 may include a computer or any other processor capable of communicating with other computers. For example, registrar computer 104 may include a Sun Enterprise 5500 Server available from Sun Microsystems, Inc. A registrar may use registrar computer 104, which may store registration information for a domain name, to register new domain names, change domain name information, or deactivate domain names.

Whois computer 106 may include a computer, such as a Sun Enterprise 4500 server or any other processor capable of communicating with other computers. Whois computer 106 may include domain name information, including a copy of the registration information stored on registrar computer and other related information, such as the date and time when a record is last updated. Whois computer 106 may provide this information to other computers upon request.

Service computer 108 may include a computer, such as a Sun Enterprise 250 server or a personal computer or any other processor capable of communicating with other computers. Service computer 108 may receive from other computers requests for domain name information and process these requests, for example, by requesting the information from whois computer 106.

Firewall 110 may include a conventional firewall to protect against unwanted attempts to gain access to whois computer 106 and registrar computer 104.

Each of networks 112, 114, and 116 may include a Local Area Network (LAN) or a Wide Area Network (WAN). In addition, the networks may also include a combination of public (e.g., Internet) and private networks.

Other system and network configurations will be apparent to those skilled in the art and are also within the scope of the present invention. For example, system 100 as shown in FIG. 1 may include more than one registrar computer 104, one whois computer 106, and one service computer 108 to provide load balancing and fail-over capabilities. Likewise, it will be apparent to one skilled in the art that a single computer may perform the functions performed by registrar computer 104, whois computer 106, and service computer 108. Moreover, it will be apparent to one skilled in the art that the components shown in FIG. 1 may use various protocols, such as Hypertext Transport Protocol (HTTP) and Transmission Control Protocol/Internet Protocol (TCP/IP) to communicate with each other.

Figure 2:
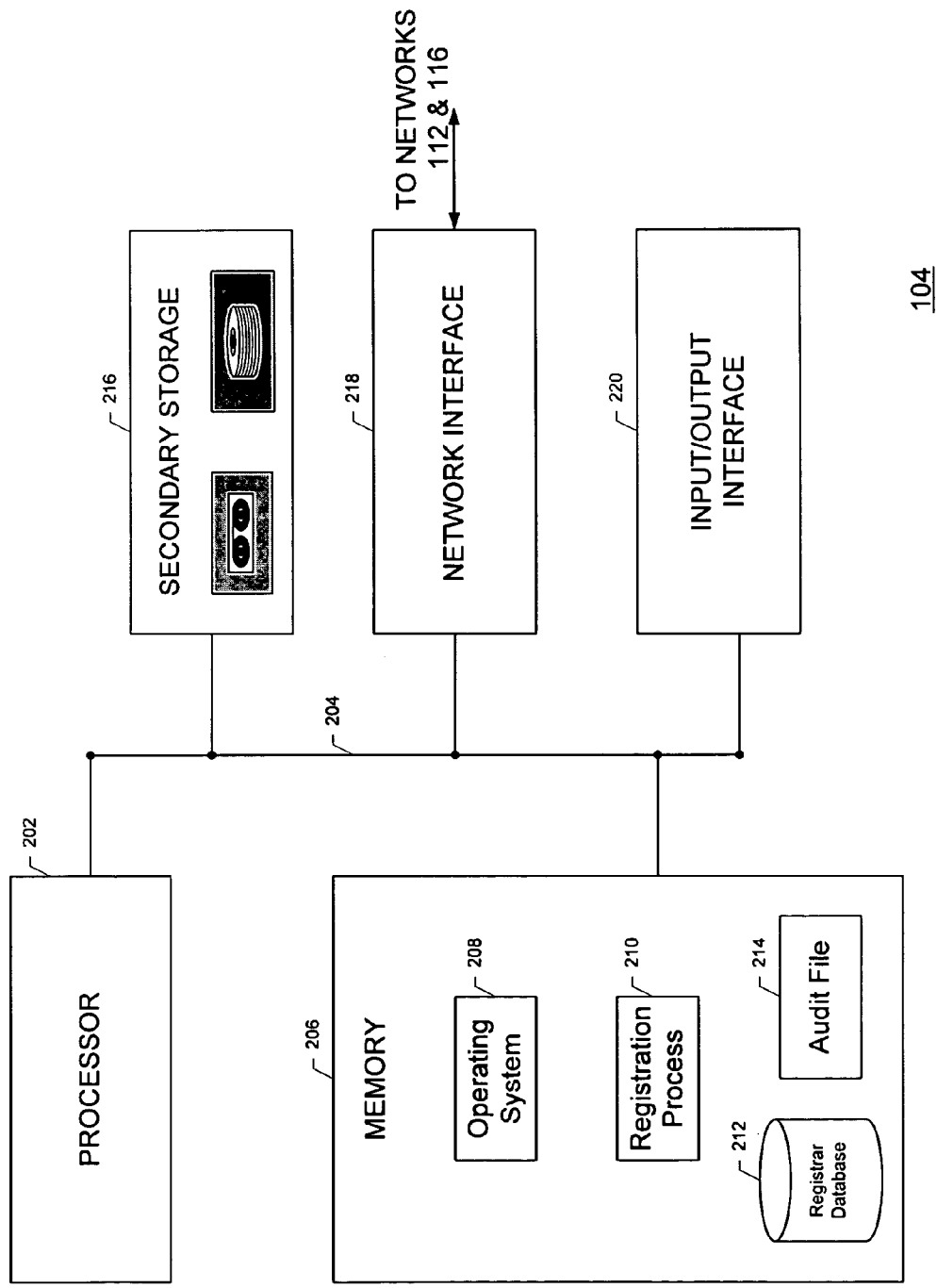
FIG. 2 is an exemplary block diagram of a registrar computer, in accordance with methods and systems consistent with the present invention.

FIG. 2 is an exemplary block diagram of registrar computer 104, in accordance with methods and systems consistent with the present invention. Registrar computer 104 may comprise a processor 202, which connects via a bus 204 to a memory 206, a secondary storage 216, a network interface 218, and an input/output interface 220.

Memory 210 may include an operating system 208, a registration process 210, a registrar database 212, and an audit file 214. Memory 210 may also include a relational database management system, such as Ingres available from Computer Associates International, Inc.

Operating system 208 may include, for example, the Solaris operating system available from Sun Microsystems, Inc. Registration process 210 may include stored instructions in the form of software, which are executed by processor 202. Registration process 210 may include any conventional process used by a registrar to register domain names, change domain name information, and deactivate domain names. Registrar database 212 may include any type of database, such as a relational database and may include registration information obtained from a user during registration and other registrar information, such as employee information. Each record in the registrar database 212 may have an associated unique identifier.

Audit file 214 may include information about modifications to registrar database 212. Modifications may include additions, deletions, and changes to the records stored in the registrar database 212. In one embodiment, audit file 214 may be generated by a database management system, such as Ingres, running on registrar computer 104. In another embodiment, audit file 214 may be generated by a process running in memory 206 that can track changes to registrar database 212. Regardless of which component generates audit file 214, it may track the modifications to registrar database 212 on a real-time basis.

Secondary storage 216 may comprise a computer readable medium, such as a disk drive and a tape drive. From the tape drive, software and data may be loaded onto the disk drive, which can then be copied into memory 206. Similarly, software and data in memory 206 may be copied onto the disk drive, which can then be loaded onto the tape drive.

Network interface 218 may transmit messages from registrar computer 104 to other computers, such as client computers 102 and whois computer 106 and receive messages addressed to registrar computer 104 from other computers, for example, via networks 112 and/or 116. Input/Output interface 220 may include, for example, a key board or a key pad and a display unit.

Figure 3:
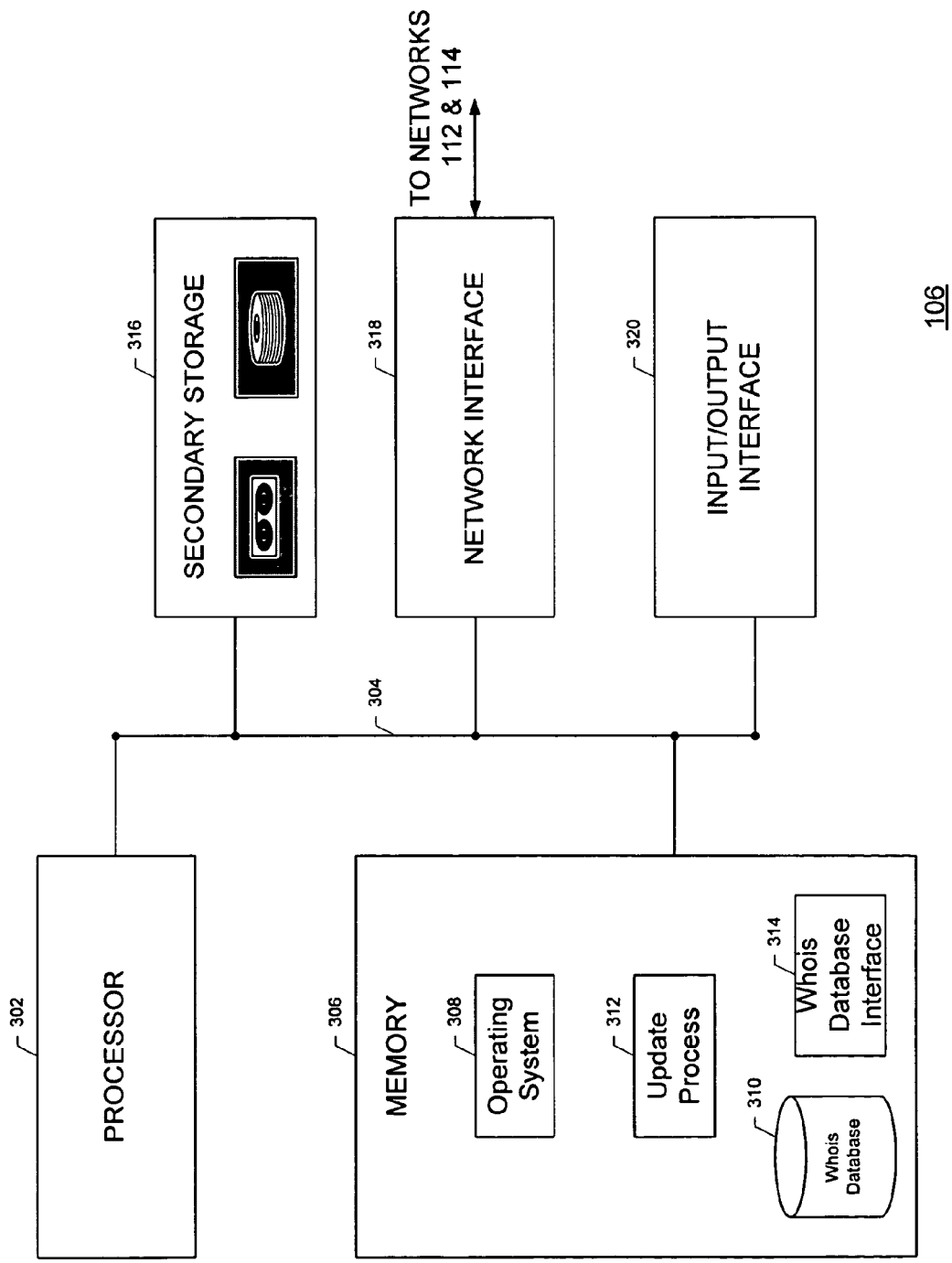
FIG. 3 is an exemplary block diagram of a whois computer, in accordance with methods and systems consistent with the present invention.

FIG. 3 is an exemplary block diagram of whois computer 106, in accordance with methods and systems consistent with the present invention. Whois computer 106 may comprise a processor 302, which connects via a bus 304 to a memory 306, a secondary storage 316, a network interface 318, and an input/output interface 320.

Memory 306 may include an operating system 308, a whois database 310, an update process 312, and a whois database interface 314. Memory 306 may also include a relational database management system, such as Oracle 8i version 8.1.6 available from Oracle Corporation.

Operating system 308 may include, for example, the Solaris operating system. Whois database 310 may include any type of database, such as the Oracle 8i database. Each record in whois database 310 may include domain name information along with an associated unique identifier. Update process 312 may include stored instructions in the form of software, which are executed by processor 302. Update process 312 may read audit file 214 to determine the modifications to registrar database 212 and may update whois database 310 to reflect the modifications. Whois database interface 314 may retrieve information from whois database 310 in response to requests received from other computers, such as requests for domain name information and may send the retrieved information to these computers. Whois database interface 314 may include, for example, a Java Database Connectivity (JDBC) server side application program interface for processing the requests.

Secondary storage 316 may comprise a computer readable medium, such as a disk drive and a tape drive. From the tape drive, software and data may be loaded onto the disk drive, which can then be copied into memory 306. Similarly, software and data in memory 306 may be copied onto the disk drive, which can then be loaded onto the tape drive.

Network interface 318 may transmit messages from whois computer 106 to other computers, such as registrar computer 104 and service computer 108 and receive messages addressed to whois computer 106 from other computers, for example, via networks 112 and/or 114. Input/Output interface 320 may include, for example, a key board or a key pad and a display unit.

Figure 4:
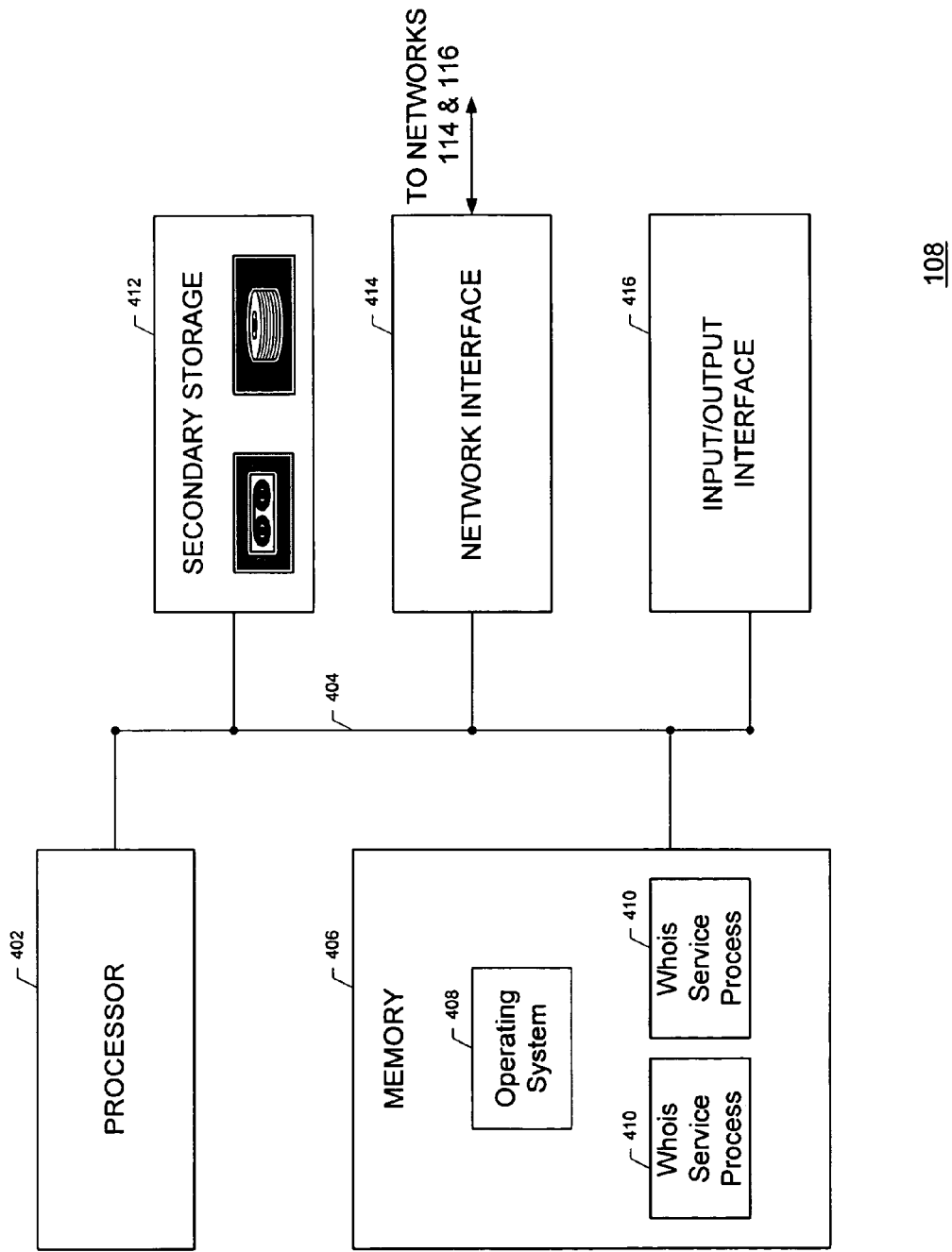
FIG. 4 is an exemplary block diagram of a service computer, in accordance with methods and systems consistent with the present invention.

FIG. 4 is an exemplary block diagram of service computer 108, in accordance with methods and systems consistent with the present invention. Service computer 108 may comprise a processor 402, which connects via a bus 404 to a memory 406, a secondary storage 412, a network interface 414, and an input/output interface 416.

Memory 406 may include an operating system 408 and one or more instances of whois service process 410. Operating system 408 may include, for example, the Solaris operating system, the Linux operating system, or a Windows operating system (e.g., Windows NT). Whois service process 410 may include stored instructions in the form of software, which are executed by processor 402. Whois service process 410 may receive requests for domain name information and process these requests by requesting the domain name information from whois database 310. Whois service process 410 may also include, for example, a Java Database Connectivity (JDBC) client side application program interface for processing the requests.

Secondary storage 412 may comprise a computer readable medium, such as a disk drive and a tape drive. From the tape drive, software and data may be loaded onto the disk drive, which can then be copied into memory 406. Similarly, software and data in memory 406 may be copied onto the disk drive, which can then be loaded onto the tape drive.

Network interface 414 may transmit messages from service computer 108 to other computers, such as client computers 102 and whois computer 106 and receive messages addressed to service computer 108 from other computers, for example, via networks 114 and/or 116. Input/Output interface 416 may include, for example, a key board or a key pad and a display unit.

Figure 5:
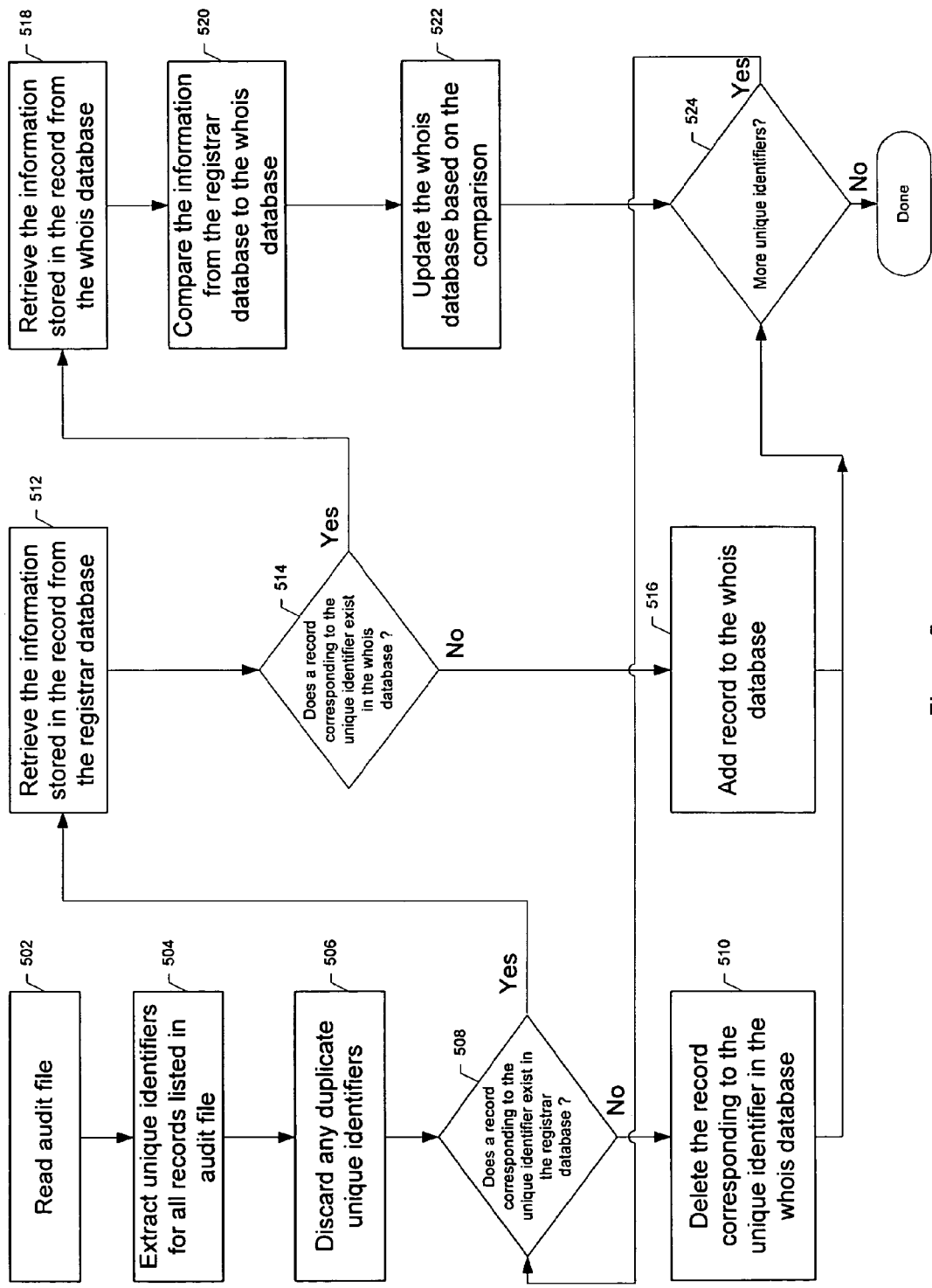
FIG. 5 is an exemplary flowchart illustrating the steps performed by an update process in a whois computer, in accordance with methods and systems consistent with the present invention.

FIG. 5 is an exemplary flowchart illustrating the steps performed by update process 312, in accordance with methods and systems consistent with the present invention. Update process 312 may connect to registrar computer 104 and read audit file 214 (step 502). Audit file 214 may include information about modifications to registrar database 212, such as unique identifiers for every record that has been added, deleted, or changed in a given time period, for example, the last two hours. In one embodiment, audit file 214 may include information in binary form and thus, update process 312 may convert the information from binary form to ASCII form or may request another process, such as a database management utility tool to convert the information from binary form to ASCII form.

Next, update process 312 may extract all the unique identifiers from audit file 214 (step 504). In one embodiment, if registrar database 212 includes information other than registration information, such as products or employee information, update process 312 may only extract the unique identifiers associated with the registration information. In this embodiment, depending on the type of database, update process 312 may use certain information unique to the registration information to retrieve the unique identifiers. For example, if registrar database 212 is a relational database, update process 312 may use the name of the table containing the registration information to extract the unique identifiers from audit file 214.

Once the unique identifiers have been extracted, update process 312 may review all the extracted unique identifiers and discard any duplicate unique identifiers (step 506). For example, during a given time period, a record may be updated twice and thus audit file 214 may contain the unique identifier for this record twice. To avoid multiple updates, update process 312 may discard one of the two unique identifiers.

After discarding any duplicate unique identifiers, update process 312 may select a unique identifier from the extracted unique identifiers and query registrar database 212 to determine if the selected unique identifier has a corresponding record in registrar database 212 (step 508). If the registrar database 212 does not have a corresponding record in registrar database 212, update process 312 may delete the record corresponding to the unique identifier in whois database 310 (step 510). After deleting the record, update process 312 may review the extracted unique identifiers to determine if the update process needs to be repeated for another unique identifier (step 524). If update process 312 determines that the update process does not need to be repeated, update process 312 may terminate (step 524). On the other hand, if update process 312 determines that the process needs to be repeated for another unique identifier, update process 312 may repeat the process (steps 524 and 508).

If, on the other hand, update process 312 determines that the selected unique identifier does have an associated record in registrar database 212 (step 508), update process 312 may retrieve the information stored in the record from the registrar database 212 (step 512). Then, update process 312 may query whois database 310 to determine if whois database 310 includes a record corresponding to the unique identifier (step 514). If whois database 310 does not include a record corresponding to the unique identifier, update process 312 may add a record to whois database using the information retrieved from registrar database (step 516). After updating whois database 310, update process 312 may review the extracted unique identifiers to determine if the update process needs to be repeated for another unique identifier (step 524). If update process 312 determines that the process does not need to be repeated, update process 312 may terminate (step 524). On the other hand, if update process 312 determines that the process needs to be repeated for another unique identifier, update process 312 may repeat the process (steps 524 and 508).

If whois database 310 includes a record corresponding to the selected unique identifier (step 514), update process 312 may retrieve the information stored in the record from whois database (step 518). After retrieving the information, update process 312 may compare this information with the information retrieved from registrar database 212 (step 520). Then, based on the comparison, update process 312 may update some or all of the information in the record stored in whois database 310 (step 522). For example, if during the comparison, it is determined that the address information does not match, update process 312 may update whois database 310 with that information. Alternatively, if a registrar prefers updating all the information in a record stored in whois database 310, all the information in the record may be updated (step 522).

After updating whois database 310, update process 312 may review the extracted unique identifiers to determine if the update process needs to be repeated for another unique identifier (step 524). If update process 312 determines that the process does not need to be repeated, update process may terminate (step 524). On the other hand, if update process 312 determines that the process needs to be repeated for another unique identifier, update process 312 may repeat the process (steps 524 and 508).

Update process 312 may use any type of language, such as structured query language (SQL) to retrieve information from registrar database 212 and whois database 310 and to update whois database 310. Moreover, depending on the registrar, update process 312 may run many times during a day. For example, in one embodiment, update process 312 may run on a real-time basis so that the modifications in registrar database 212 are reflected in whois database 310 on a real-time basis. In another embodiment, update process 312 may run on an hourly basis, reflecting the modifications in registrar database 212 in whois database 310 on an hourly basis.

Furthermore, update process 312 may select the portion of audit file 214 for a time period different from the one it selected before. In another embodiment, update process 312 may tag audit file 214 so that update process 312 does not repeat the update process for a record that has been previously updated. In still another embodiment, the program that generates the audit file may generate a new audit file 214 after a specific time period, eliminating the need to select a time period or to tag audit file 214. Instead, update process 312 may access a new audit file 214 every time it runs.

In addition to the unique identifier, audit file 214 may also indicate whether a record has been added, new, or changed. In this example, if audit file 214 indicates that a record corresponding to a unique identifier is new, update process 312 may retrieve the record from registrar database 212 and add it to whois database 310 without querying registrar database 212 or whois database 310. Similarly, if audit file 214 indicates that a record corresponding to a unique identifier has been deleted, update process 312 may delete the record in whois database 310 without querying registrar database 212. Finally, if audit file 214 indicates that a record has been changed, update process 312 may retrieve the information associated with the record from registrar database 212 and update whois database 310 with the retrieved information.

In another embodiment, in addition to including unique identifiers, audit file 214 may indicate whether a record has been changed, added, or deleted. If a record has been changed or added, audit file 214 may include information about the change and the new record. In this embodiment, update process 312 would not retrieve information from registrar database 212 and may instead rely on audit file 214 to determine the change or added record.

It will be apparent to one skilled in the art that if a record in the whois database 310 is related to another record, for example, in a parent-child relationship, update process 312 may update the child records first before updating the parent records. Likewise, it will be apparent to one skilled in the art that update process 312 may update one record at a time or update multiple records at one time.

Figure 6:
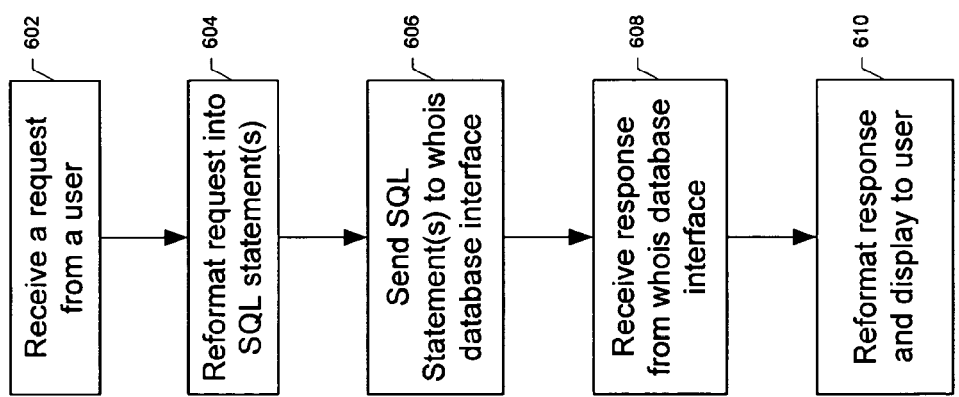
FIG. 6 is an exemplary flowchart illustrating the steps performed by a whois service process in a service computer, in accordance with methods and systems consistent with the present invention.

FIG. 6 is an exemplary flowchart illustrating the steps performed by whois service process 410, in accordance with methods and systems consistent with the present invention. Whois service process 410 may receive a request for domain name information from a user at a client computer 102 (step 602).

Whois service process 410 may receive the request and reformat it into one ore more SQL statements (step 604) and send the SQL statement(s) to whois database interface 314 (step 606). Whois database interface 314 may in turn retrieve the requested information from whois database 310 by executing the SQL statement(s).

Once the requested information has been retrieved, whois database interface 314 may send to whois service process 410, a response that includes the requested information. Whois service process 410 may then receive the response, reformat the response if needed and display it to the user (steps 608 and 610).

If the requested information is not found in the whois database 310, whois database interface 314 may send a response indicating that the requested information does not exist in the whois database 310. Whois service process 410 may then display a message to the user indicating that the requested information does not exist in the database.

In another embodiment, systems and methods consistent with the present invention may provide a flat file database and index files for retrieving information, such as domain name information. In accordance with this embodiment, a system, for example system 100, may include the whois computer shown in FIG. 7 and the service computer shown in FIG. 8 instead of whois computer 106 and service computer 108. The whois computer may create a flat file database and index files from a whois database periodically, for example, every two hours. Once a flat file database and index files have been created, the whois computer may copy them to the service computer. The service computer may receive requests for information, including requests for domain name information, from other computers, such as client computers 102 and process these requests by using the flat file database and index files located on the service computer.

Figure 7:
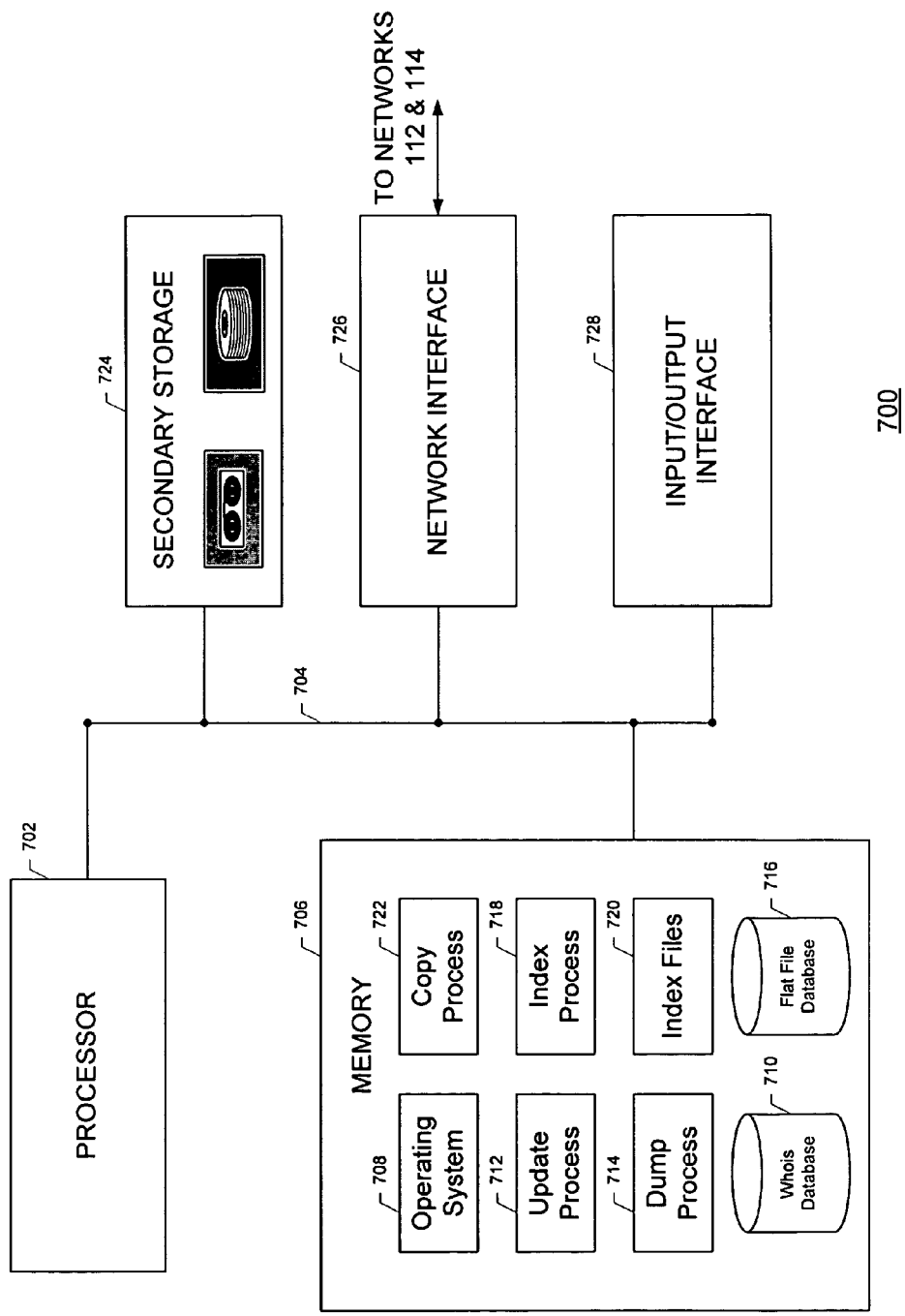
FIG. 7 is an exemplary block diagram of another whois computer, in accordance with methods and systems consistent with the present invention.

FIG. 7 is an exemplary block diagram of whois computer 700, in accordance with methods and systems consistent with the present invention. Whois computer 700 may comprise a processor 702, which connects via a bus 704 to a memory 706, a secondary storage 724, a network interface 726, and an input/output interface 728.

Memory 706 may include an operating system 708, a whois database 710, an update process 712, a dump process 714, a flat file database 716, an index process 718, one or more index files 720, and a copy process 722. Memory 706 may also include a relational database management system, such as Oracle 8i version 8.1.6, available from Oracle Corporation.

Operating system 708 may include, for example, the Solaris operating system. Whois database 710 may include any type of database, such as the Oracle 8i database. Each record in whois database 710 may include domain name information along with an associated unique identifier.

Update process 712, dump process 714, index process 718, and copy process 722 may include stored instructions in the form of software, which are executed by processor 702. Update process 712, like update process 312, may read audit file 214 to determine the modifications to registrar database 212 and may update whois database 710 to reflect the modifications. Dump process 714 may retrieve information stored in whois database 710 and may create a flat file database 716. Flat file database 716 may be a conventional flat file database that includes records with no structured relationships. Index process 720 may create one or more index files 720. Index files 722 may be conventional index files that may include a list of keys, each of which may identify a unique record in flat file database 716. Copy process 722 may copy flat file database 716 and index files 720 to a service computer, for example the service computer shown in FIG. 8.

Secondary storage 724 may comprise a computer readable medium, such as a disk drive and a tape drive. From the tape drive, software and data may be loaded onto the disk drive, which can then be copied into memory 706. Similarly, software and data in memory 706 may be copied onto the disk drive, which can then be loaded onto the tape drive.

Network interface 726 may transmit messages from whois computer 700 to other computers, such as registrar computer 104 and service computer 108 and receive messages addressed to whois computer 700 from other computers via, for example, networks 112 and/or 114. Input/Output interface 728 may include, for example, a key board or a key pad and a display unit.

Figure 8:
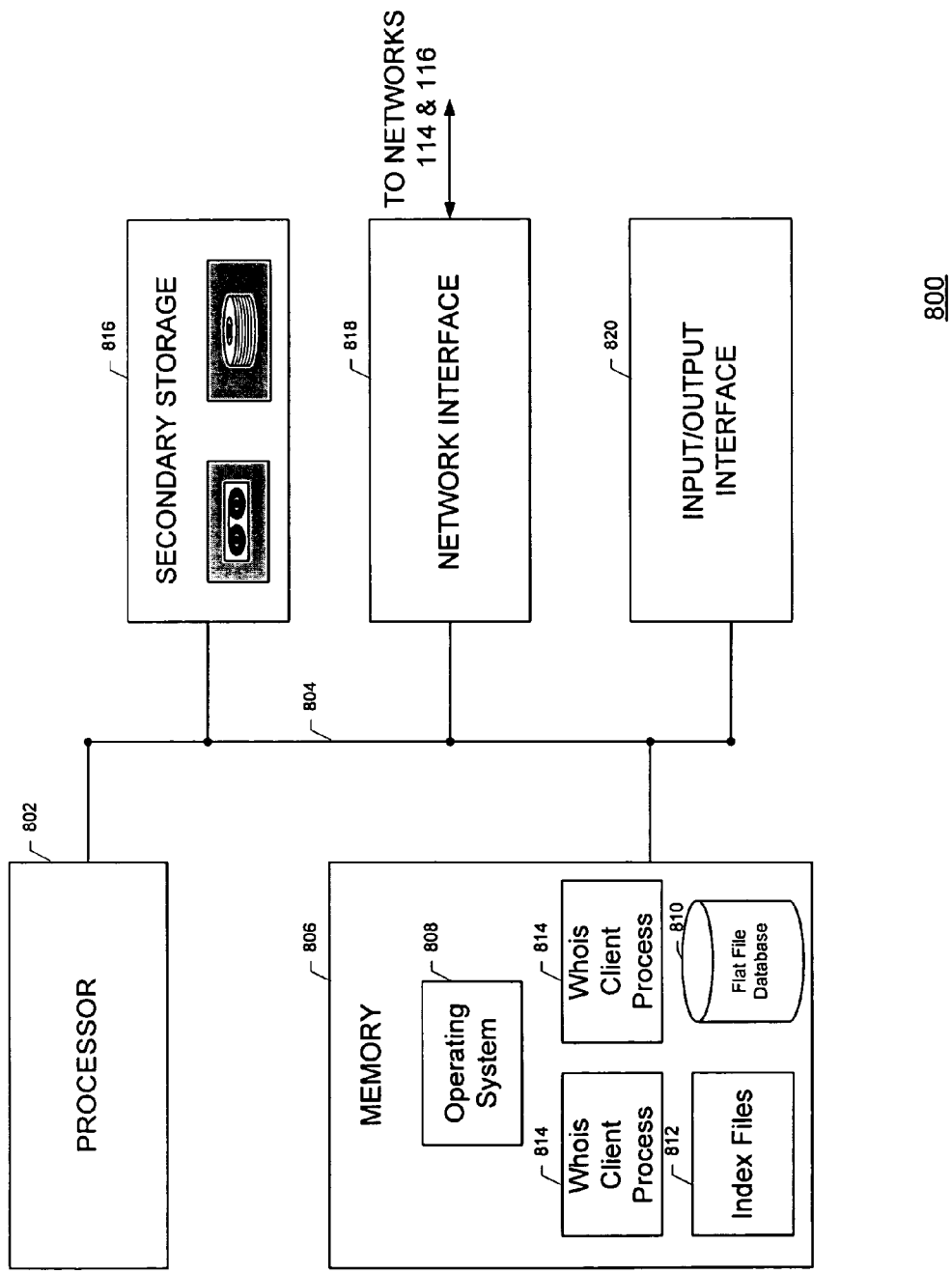
FIG. 8 is an exemplary block diagram of another service computer, in accordance with methods and systems consistent with the present invention.

FIG. 8 is an exemplary block diagram of service computer 800, in accordance with methods and systems consistent with the present invention. Service computer 800 may comprise a processor 802, which connects via a bus 804 to a memory 806, a secondary storage 816, a network interface 818, and an input/output interface 820.

Memory 806 may include an operating system 808, flat file database 810, one or more index files 812, and one or more instances of whois client process 814. Operating system 808 may include, for example, the Solaris operating system, the Linux operating system, or a Windows operating system (e.g., Windows NT). Flat file database 810 and index files 812 may include copies of flat file database 716 and index files 720 located on whois computer 700. Whois client process 814 may include stored instructions in the form of software, which are executed by processor 802. Whois client process 814 may receive requests for domain name information and may process the requests by retrieving the requested information from flat file database 810 using index files 812.

Secondary storage 816 may comprise a computer readable medium, such as a disk drive and a tape drive. From the tape drive, software and data may be loaded onto the disk drive, which can then be copied into memory 806. Similarly, software and data in memory 806 may be copied onto the disk drive, which can then be loaded onto the tape drive.

Network interface 818 may transmit messages from service computer 800 to other computers, such as client computers 102 and receive messages addressed to service computer 800 from other computers via, for example, networks 114 and/or 116. Input/Output interface 416 may include, for example, a key board or a key pad and a display unit.

If a system includes whois computer 700 and service computer 800, a user at a client computer may request from whois client process 814 information, including domain name information. Whois client process 814 may in turn search the index files 812 to obtain the identifier corresponding to the requested information. Once it has obtained the identifier, whois client process 814 may retrieve the information from flat file database 810 using the identifier and display the retrieved information to the user. If whois client process 814 cannot locate the identifier, it may display a message to the user indicating that the requested information does not exist in the database.

The above-noted features, other aspects, and principles of the present invention may be implemented in various system or network configurations to provide automated and computational tools for maintaining and accessing a whois database. Such configurations and applications may be specially constructed for performing the various processes and operations of the invention or they may include a general purpose computer or computing platform selectively activated or reconfigured by program code to provide the necessary functionality. The processes disclosed herein are not inherently related to any particular computer or other apparatus, and may be implemented by a suitable combination of hardware, software, and/or firmware. For example, various general purpose machines may be used with programs written in accordance with teachings of the invention, or it may be more convenient to construct a specialized apparatus or system to perform the required methods and techniques.

The present invention also relates to computer readable media that include program instruction or program code for performing various computer-implemented operations based on the methods and processes of the invention. The media and program instructions may be those specially designed and constructed for the purposes of the invention, or they may be of the kind well-known and available to those having skill in the computer software arts. The media may take many forms including, but not limited to, non-volatile media, volatile media, and transmission media. Non-volatile media includes, for example, optical or magnetic disks. Volatile media includes, for example, dynamic memory. Transmission media includes, for example, coaxial cables, copper wire, and fiber optics. Transmission media can also take the form of acoustic or light waves, such as those generated during radio-wave and infra-red data communications. Examples of program instructions include both machine code, such as produced by compiler, and files containing a high level code that can be executed by the computer using an interpreter.

Furthermore, it will be apparent to those skilled in the art that various modifications and variations can be made in the system and method of the present invention and in construction of this invention without departing from the scope or spirit of the invention. For example, instead of audit file 214 and update process 312, registration process 210 or another process on registrar computer 104 may update the whois database 310 whenever registrar database 212 is modified. Likewise, it will be apparent to one skilled in the art that multiple instances of a process (e.g., registration process 210) may run on a computer in system 100.

Moreover, other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for maintaining a whois database, comprising:
   extracting a plurality of unique identifiers from an audit file, each unique identifier corresponding to a modified or deleted domain name record within a registrar database; and
   for each unique identifier:
   determining whether a first domain name record that corresponds to the unique identifier exists within the registrar database;
   if the first domain name record exists, retrieving the first domain name record from the registrar database;
   determining whether a second domain name record that corresponds to the unique identifier exists within the whois database;
   if the second domain name record exists, retrieving the second domain name record from the whois database;
   comparing the first domain name record to the second domain name record; and
   updating the second domain name record, within the whois database, based on the first domain name record.

2. The method of claim 1, further comprising
   if the first domain name record does not exist, deleting the second domain name record from the whois database.

3. The method of claim 1, further comprising:
   if the second domain name record does not exist, adding the first domain name record to the whois database.

4. The method of claim 1, further comprising:
   discarding duplicate unique identifiers from the plurality of unique identifiers.

5. The method of claim 1, wherein the modified or deleted domain name record consists of an added domain name record, a deleted domain name record and a changed domain name record.

6. The method of claim 5, wherein the audit file includes an indicator associated with each unique identifier, the indicator consisting of an added indicator, a deleted indicator and changed indicator.

7. The method of claim 1, wherein the audit file includes modified domain name information associated with each unique identifier.

8. The method of claim 1, wherein the plurality of unique identifiers is associated with a time period.

9. The method of claim 1, further comprising:
   tagging the audit file to identify previously extracted unique identifiers.

10. The method of claim 1, wherein the whois database is a copy of the registrar database.

11. A computer-readable storage medium including instructions for execution by a processor which, when executed by the processor, cause the processor to perform a method for maintaining a whois database, the method comprising:
    extracting a plurality of unique identifiers from an audit file, each unique identifier corresponding to a modified or deleted domain name record within a registrar database; and
    for each unique identifier:
    determining whether a first domain name record that corresponds to the unique identifier exists within the registrar database;
    if the first domain name record exists, retrieving the first domain name record from the registrar database,
    determining whether a second domain name record that corresponds to the unique identifier exists within the whois database;
    if the second domain name record exists, retrieving the second domain name record from the whois database;
    comparing the first domain name record to the second domain name record; and
    updating the second domain name record, within the whois database, based on the first domain name record.

12. The computer-readable storage medium of claim 11, wherein the method further comprises:
    if the first domain name record does not exist, deleting the second domain name record from the whois database.

13. The computer-readable storage medium of claim 11, wherein the method further comprises:
    if the second domain name record does not exist, adding the first domain name record to the whois database.

14. The computer-readable storage medium of claim 11, wherein the method further comprises:
    discarding duplicate unique identifiers from the plurality of unique identifiers.

15. The computer-readable storage medium of claim 11, wherein the modified or deleted domain name record consists of an added domain name record, a deleted domain name record and a changed domain name record.

16. The computer-readable storage medium of claim 15, wherein the audit file includes an indicator associated with each unique identifier, the indicator consisting of an added indicator, a deleted indicator and changed indicator.

17. The computer-readable storage medium of claim 11, wherein the audit file includes modified domain name information associated with each unique identifier.

18. The computer-readable storage medium of claim 11, wherein the plurality of unique identifiers is associated with a time period.

19. The computer-readable storage medium of claim 11, wherein the method further comprises:
    tagging the audit file to identify previously extracted unique identifiers.

20. The computer-readable storage medium of claim 11, wherein the whois database is a copy of the registrar database.

21. A system, comprising:
    a registrar computer, including a registrar database having a plurality of domain name records and an audit file having a plurality of unique identifiers, each unique identifier corresponding to a modified or deleted domain name record within the registrar database; and a whois computer in communication with the registrar computer, the whois computer including a processor, a whois database having a plurality of domain name records, and stored instructions adapted to be executed by the processor to perform a method, the method comprising:

extracting the plurality of unique identifiers from the audit file; and for each unique identifier:
- determining whether a first domain name record that corresponds to the unique identifier exists within the registrar database,
- if the first domain name record exists, retrieving the first domain name record from the registrar database,
- determining whether a second domain name record that corresponds to the unique identifier exists within the whois database,
- if the second domain name record exists, retrieving the second domain name record from the whois database,
- comparing the first domain name record to the second domain name record, and updating the second domain name record, within the whois database, based on the first domain name record.

22. The system of claim 21, wherein the method further comprises:
if the first domain name record does not exist, deleting the second domain name record from the whois database.

23. The system of claim 21, wherein the method further comprises:
if the second domain name record does not exist, adding the first domain name record to the whois database.

24. The system of claim 21, wherein the method further comprises:
discarding duplicate unique identifiers from the plurality of unique identifiers.

25. The system of claim 21, wherein the modified or deleted domain name record consists of an added domain name record, a deleted domain name record and a changed domain name record.

26. The system of claim 25, wherein the audit file includes an indicator associated with each unique identifier, the indicator consisting of an added indicator, a deleted indicator and changed indicator.

27. The system of claim 21, wherein the audit file includes modified domain name information associated with each unique identifier.

28. The system of claim 21, wherein the plurality of unique identifiers is associated with a time period.

* * * * *